United States Patent [19]

Reisberg

[11] 4,203,491

[45] May 20, 1980

[54] CHEMICAL FLOOD OIL RECOVERY WITH HIGHLY SALINE RESERVOIR WATER

[75] Inventor: Joseph Reisberg, Houston, Tex.

[73] Assignee: Shell Oil Company, Houston, Tex.

[21] Appl. No.: 939,521

[22] Filed: Sep. 5, 1978

[51] Int. Cl.$^2$ .............................................. E21B 43/22
[52] U.S. Cl. ..................................... 166/274; 166/252
[58] Field of Search ..................... 166/273, 274, 275; 252/8.55 D

[56] References Cited

U.S. PATENT DOCUMENTS

| | | | |
|---|---|---|---|
| 3,096,820 | 7/1963 | Bernard | 166/274 |
| 3,330,346 | 7/1967 | Jacobs et al. | 166/273 |
| 3,346,047 | 10/1967 | Townsend et al. | 166/273 |
| 3,348,611 | 10/1967 | Reisberg | 166/274 X |
| 3,486,560 | 12/1969 | Hutchison | 166/275 X |
| 3,491,832 | 1/1970 | Raza | 166/273 X |
| 3,500,924 | 3/1970 | Poettmann | 166/274 |
| 3,529,668 | 9/1970 | Bernard | 166/273 |
| 3,653,440 | 4/1972 | Reisberg | 166/273 |
| 3,893,511 | 7/1975 | Root | 166/274 X |
| 3,977,471 | 8/1976 | Gale et al. | 166/273 |
| 4,018,278 | 4/1977 | Shupe | 166/274 |
| 4,077,471 | 3/1978 | Shupe et al. | 252/8.55 D X |
| 4,105,570 | 8/1978 | Stournas et al. | 166/273 X |

*Primary Examiner*—Stephen J. Novosad
*Assistant Examiner*—George A. Suchfield

[57] ABSTRACT

In an oil reservoir in which the water contains more than about 9% dissolved salt, oil is produced by injecting an oil-displacing dispersion of at least one surface active alkylaryloxy polyethoxyethane sulfonate in the reservoir water or an equally saline water followed by a mobility controlling dispersion of noncondensible gas in an equally saline water.

6 Claims, 4 Drawing Figures

CHEMICAL FLOOD OIL RECOVERY WITH HIGHLY SALINE RESERVOIR WATER

BACKGROUND OF THE INVENTION

The invention relates to a chemical flooding process for producing oil from a subterranean reservoir. More particularly, it relates to such a process which is best suited for use in an oil reservoir in which the predominant aqueous liquid has a dissolved salt content of more than about 9%.

As indicated in a paper presented at a symposium on improved methods for oil recovery in April 1978, SPE Paper No. 7053, two essential criteria that must be met for successful recovery of residual oil by chemical flooding are (1) very low interfacial tension between the chemical bank and the residual oil and between the chemical bank and the drive fluid, and (2) small surfactant retention losses to the reservoir rock. The paper relates to the phase behavior of such a chemical bank (or microemulsion or aqueous surfactant system) as a function of salinity and describes how the salinity of the drive water or fluid (or mobility buffer fluid) tends to control the amount of the surfactant retention.

In a collection of papers, "Improved Oil Recovery By Surfactant Flooding," D. O. Shah and R. S. Schechter, Academic Press, New York 1977; a paper by S. P. Trushenski, "Micellar Flooding: Sulfonate-Polymer Interaction", considers the sulfonate-polymer incompatibility in a chemical flood process in which the reservoir oil and water are displaced by a micellar fluid followed by a polymer-thickened mobility buffer bank. That paper indicates that the interaction between the sulfonate and polymer tends to increase the sulfonate requirement and the extent of that interaction increases with increases in the drive water salinity, regarding drive waters thickened by either bipolymers, i.e., xanthan gum polymers, or partially hydrated polyacrylamide polymers.

Although, in some reservoirs, the extent of the polymer-surfactant interaction can be reduced by reducing the salinity of a polymer-thickened mobility buffer liquid relative to that of an aqueous surfactant system, in reservoirs which contain highly saline waters, such a reduction in salinity may not be feasible. For example, in U.S. Pat. No. 4,074,755 by H. J. Hill, J. Reisberg, F. G. Hellfrich, L. W. Lake and G. A. Pope, it is pointed out that, although numerous chemical flooding procedures have been suggested for utilizing relatively low salinity surfactant systems and/or polymer containing mobility buffers, such procedures have often been unsucessful. In such procedures the salinities of the injected fluid are often drastically altered by interactions within the reservoir. Among the more important physical and chemical mechanisms which operate within typical oil bearing reservoirs are the cross flow of fluids between layers of different permeability, the dispersive mixing between the fluids being displaced and the displacing fluid, the dissolving of minerals when a water differing from the formation water contacts the reservoir rock, and the cation-exchange reactions between the reservoir rocks and the injected water. The patent also mentions that when the reservoir water is highly saline, or contains large proportions of multivalent cations, it may be impossible, or at least uneconomical, to formulate an active surfactant system having an ionic composition (or salinity) equivalent to that of the reservoir water.

In an aqueous surfactant system the capability of forming an effectively low interfacial tension against the reservoir oil frequently occurs within a range of salinity such that the system forms three equilibrium phases when contacted by the oil and brine of the oil-containing reservoir. In such a situation a surfactant-rich phase, which may contain a large amount of both oil and brine, may be in equilibrium with essentially pure brine and essentially pure oil. The salinity at which the system is capable of forming the lowest interfacial tension is called the optimum salinity. For use in a reservoir in which the brine contains both divalent and monovalent cations, the optimum salinity for a surfactant system that contains a given surfactant material usually increases with increasing surfactant concentration. But, the increasing of the surfactant concentration increases the expense of the oil recovery operation. In addition, the extent to which the salinity of the surfactant system can be increased is limited by the concentration at which that system forms two phases (in the absence of the reservoir oil).

It is known that certain surfactants may exhibit an optimum or adequate oil-displacing activity in aqueous liquids which are highly saline. Surface active alkylaryloxypolyethoxyethane sulfonate surfactants exhibit such a capability and their use in oil recovery processes has been previously proposed. For example, U.S. Pat. Nos. 4,018,278 and 4,088,189 describe (a) using such sulfonates as the predominant surfactants for imparting an oil-displacing efficiency within a highly saline aqueous surfactant system, and (b) using them in the concentrations indicated by capillary displacement tests or interfacial tension measurement tests designed for determining the economically efficient proportions to be used in aqueous liquids which are the same as or have salinities equivalent to those in highly saline reservoirs. U.S. Pat. No. 4,066,124 describes uses of such sulfonates as co-surfactants in relatively saline aqueous surfactant systems containing mixtures of predominantly water-soluble and predominantly oil-soluble petroleum sulfonate surfactants. U.S. Pat. No. 3,977,471 describes such surfactants as members of a new and improved class of surface active agents for use in chemical flood processes in reservoirs containing water with salinities of 2% or more. U.S. Pat. No. 3,827,497 describes waterflood surfactant compositions that contain sulfonated oxyalkylated alcohols and indicates that an alkylaryloxypolyethoxyethane sulfonate can be included. U.S. Pat. No. 4,077,471 describes injecting mixtures of said sulfonates with oil soluble non-ionic surfactants in highly saline aqueous mixtures ahead of polymer-thickened aqueous mobility buffer or drive fluids "if no adverse interaction occurs between the polymer and the surfactant."

U.S. Pat. No. 3,653,440 by J. Reisberg describes a water-flood oil production process in which the oil is displaced by injecting an active surfactant system followed by drive liquid comprising a mixture of a gas and an aqueous liquid, with the gas and liquid being injected so that the drive fluid mobility is relatively low and the gas moves ahead of the liquid. The patent indicates the desirability of having a surfactant in such a liquid to provide a gas-water surface tension at least as low as about 30 dynes per centimeter, so that the gas bubbles are relatively small and homogeneously distributed throughout the liquid.

SUMMARY OF THE INVENTION

This invention relates to an improvement in a process for recovering oil from a reservoir containing water which contains more than about 9% dissolved salt (or other elecrolyte) by injecting, ahead of a mobility-controlling drive fluid, an aqueous surfactant system which contains at least one surface active alkylaryloxypolyethoxyethane sulfonate dispersed within an aqueous liquid which is the reservoir water or has a salinity (or electrolyte content) equivalent to the reservoir water. The present improvement comprises a combination of steps. The surfactant used is one or a mixture of such sulfonates having a chemical composition tailored to suit the physical and chemical properties of the reservoir to be treated. The reservoir tailored surfactant comprises at least one surface active alkylaryloxypolyethoxyethane sulfonate in which the arrangement of the size and structure of the alkyl groups and the number of ethoxy groups is such that a dispersion of the reservoir-tailored surfactant in the reservoir water or one having an equivalent salinity (a) exhibits a significant and substantially optimum oil-displacing activity when the surfactant concentration is as low as about 0.1% by weight of the aqueous liquid, (b) is at least substantially a single-phase system at the reservoir temperature, and (c) is sufficiently viscous by itself or when mixed with noncondensible gas to be capable of exhibiting within the reservoir formation a mobility at least substantially as low as that of the reservoir oil within that formation. The aqueous liquid within which the reservoir tailored surfactant is dispersed to form the surfactant system to be injected is the liquid produced from the reservoir or one that is so similar in salinity as to be capable of maintaining a salinity that is substantially unaltered by ion-exchange reactions which occur when that liquid is flowed within the reservoir. In the surfactant system injected into the reservoir, the concentration of the surfactant is a value between about 3 and 10% by weight sufficient to cause a significant proportion of the injected surfactant system to retain a concentration of at least about 0.1% of the surfactant in spite of the dilution that occurs during the displacement of the surfactant system within the reservoir. The surfactant system is displaced within the reservoir by injecting it immediately ahead of a substantially homogeneous dispersion of noncondensible gas in an aqueous liquid having a composition the same as or substantially equivalent to that of the aqueous liquid used in the surfactant system with said dispersion being capable at the reservoir temperature, of exhibiting a mobility within the reservoir at least substantially as low as that of the injected surfactant system. In a preferred embodiment, the drive fluid, at the time it is injected or as soon as it has flowed through a significant portion of the reservoir, contains enough surfactant to improve the homogeneity of the dispersion of the gas within the liquid.

The present invention combines a particular way of selecting a sulfonate surfactant for use in highly saline water, a particular way of proportioning a so-selected surfactant within a particular type of such water, and a particular way of displacing the resulting surfactant system within a reservoir formation. It thus provides at least a substantial elimination of the problems due to an oil-displacement inefficiency resulting from the dilution of the surfactant system by diffusive mixing within the reservoir, a lack of or loss of mobility control due to an absence of polymeric thickening agent, or a loss of surfactant efficiency due to a polymer-surfactant incompatability within the reservoir.

As used herein, the term alkylaryloxypolyethoxyethane sulfonate refers to a sulfonate of a sulfonic acid of the formula

(alkylaryl)—O—(CH$_2$CH$_2$O)$_n$—CH$_2$CH$_2$SO$_3$H where n is a number of from about 1 to 6 and the alkylaryl group is a phenyl group to which at least one saturated or unsaturated alkyl group is attached, with the total number of carbon atoms within said alkyl groups being from about 6 to 12.

DESCRIPTION OF THE INVENTION

The present invention is at least in part premised on a discovery that alkylaryloxypolyethoxyethane sulfonate surfactants can be selected and utilized so that they provide a particularly beneficial combination of interfacial tension-lowering, mobility-decreasing and foam-forming properties when they are dispersed within relatively highly saline aqueous liquids at temperatures common in oil bearing reservoirs. When used as presently specified, these sulfonates can eliminate or at least reduce any problems due to a diffusive mixing of fluids or a surfactant-polymer incompatibility, in addition to any problems due to high salinity of the reservoir water.

In properly proportioned dispersions of such surfactants in highly saline aqueous liquids, the structure and molecular weight of the alkyl groups and number of the ethoxy groups which are contained in one or more of such surfactants can be adjusted so that a high oil-displacing activity is provided by a selected moderately low surfactant concentration. And, unobviously, such an activity can remain high throughout dilutions of the surfactant system, for example, to a concentration as low as 0.1% by weight. As known, such dilutions of the surfactant systems are substantially unavoidable when a bank of surfactant-rich aqueous liquid is being driven by aqueous liquid through a reservoir that contains a surfactant-free aqueous liquid.

The present surfactant systems are capable of exhibiting a relatively low mobility within an oil reservoir without the necessity of using polymeric water thickeners. The foam forming properties of the surfactants selected in accordance with the present procedures are such that, at an economically low concentration within highly saline aqueous liquids, they are capable of forming substantially homogeneous dispersions of noncondensible gases, which dispersions have mobilities low enough to adapt them for use as mobility-controlling drive liquids for displacing the surfactant systems and oil within the reservoir.

Laboratory Tests

Figure 1:
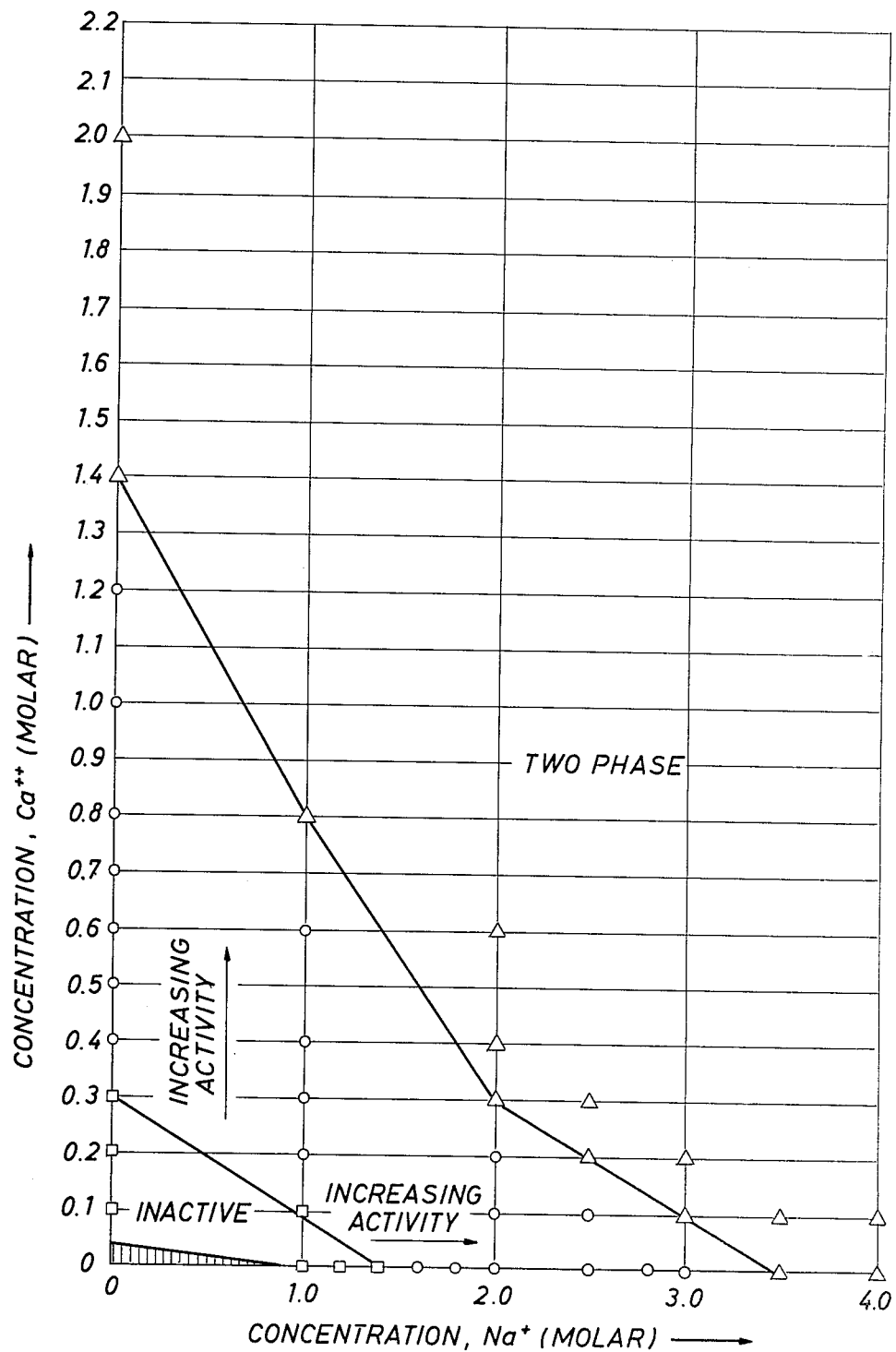
FIG. 1 shows a plot of the effects of variations in calcium ion and sodium ion concentrations on the oil displacing activities of aqueous surfactant systems containing surface active alkylaryloxypolyethoxyethane sulfonates.

FIG. 1 shows the effects of the concentration of sodium and calcium ions on dispersions of surfactants in aqueous liquids. The surfactants tested were (a) a petroleum sulfonate surfactant comprising a sulfonated hydrocarbon fraction having an average equivalent weight of 430 and containing about 1 sulfonate group per molecule which is available from Witco Chemical Company, and (b) Triton X-200 surfactant, comprising a polyethoxylated and sulfonated octylphenol in which each molecule contains an average of two ethoxy groups and one sulfonate group which "caps" the chain of ethoxy groups with an ethanesulfonate group, available from Rohm and Haas Chemical Company. The oil-displacing activities were measured by means of the microscopic screening technique described in SPE Paper No. 3798 presented at the Improved Oil Recovery Symposium in April 1972. In that procedure one observes the degree of deformation, breakup and stringer or filament formation of a microscopic drop of an oil in a stream of flowing surfactant system.

FIG. 1 shows the results of the microscopic screening tests of the relationship between sodium and calcium ion concentrations on the oil displacement capability (and/or interfacial tension lowering activity) of dispersions of the above-described surfactants in solutions of the indicated molar amounts of sodium chloride and calcium chloride in distilled water with respect to a typical reservoir crude oil at a temperature of 75° C. The data points denoted by squares refer to inactive (below optimum) surfactant systems, those marked by triangles relate to coacervate systems whch exhibit two clear liquid phases, and those marked by circles designate systems having effective oil displacing, low interfacial tensions against the oil. The vertically-hatched region in the lower left corner of FIG. 1 shows the solubility limits of the Brighton 430 petroleum sulfonate. It is believed to be clear from the data shown that the systems containing the Triton X-200 surfactant are much more effective than those containing the petroleum sulfonate surfactants.

Figure 2:
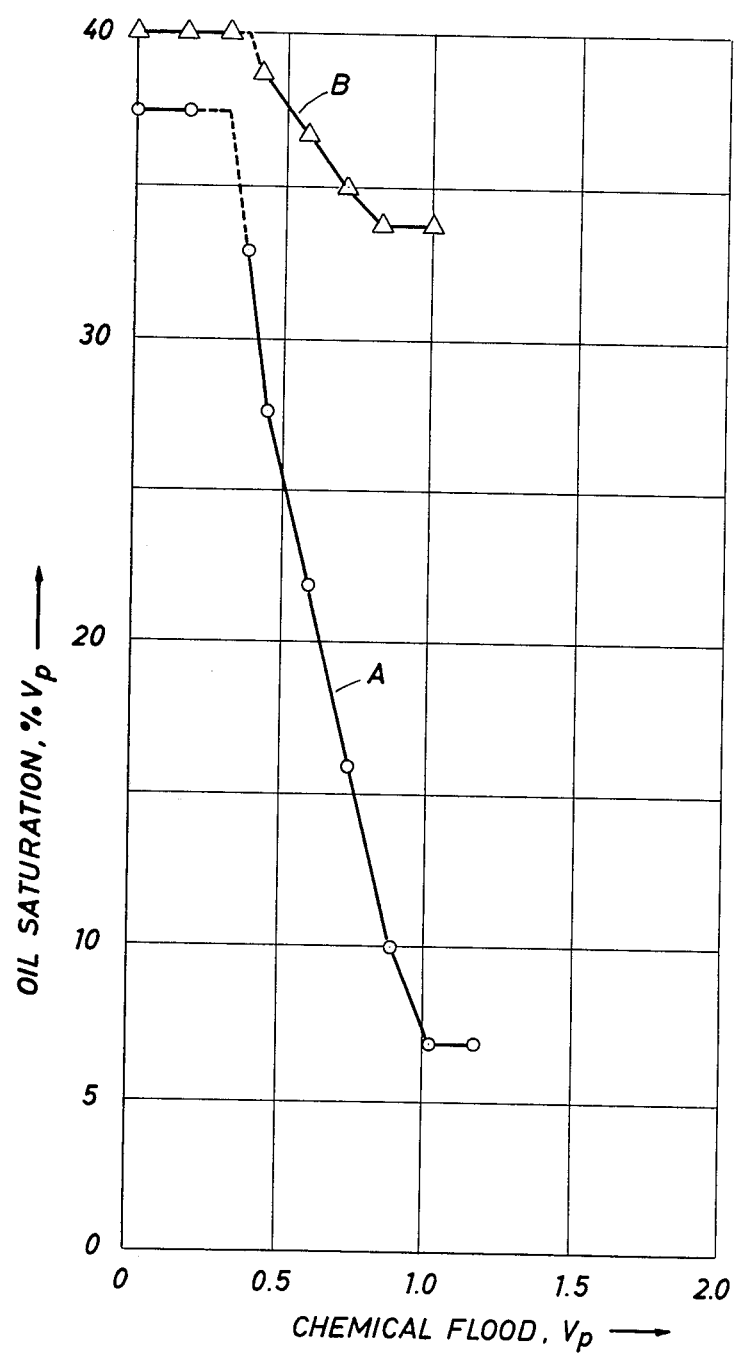
FIG. 2 shows a plot of the variations in oil saturation with amount of liquid injected into a Berea sandstone core.

FIG. 2 shows the result of oil displacement tests of two surfactant systems in Berea cores having an effective permeability to water of about 300 md. The cores were 2 inches in diameter and 10 inches long and were maintained at a temperature of 75° C. In each test the core was initially preflooded with the saline water to be used as a preflood followed by a crude oil which, at that temperature (with a 20% isooctane content), had a viscosity of 2.9 centipoise. The saline waters which were tested were synthetic reservoir water (designated as SDS water) containing approximately 11% sodium chloride, 1% magnesium chloride, 0.6% calcium chloride and minor amounts of barium and strontium, and distilled water-dilutions of the SDS water.

For Test A the oil-containing core was preflooded with the SDS water to a residual oil saturation to water and then was flooded with an aqueous surfactant system consisting of 5.4% by weight Triton X-200 surfactant (on an active basis) in SDS water; which system has a viscosity of 1.3 centipoise. A dispersion of Triton X-200 in the SDS water forms a milky suspension of an insoluble material which tends to cause face plugging of such a Berea core. The suspended material appears to consist of a non-ionic component, the presence of which was confirmed by nuclear magnetic resonance analysis. The surfactant system which was tested was subjected to centrifugation after which the supernatent layer was utilized in the test.

As indicated by curve A, of FIG. 2, an oil saturation of less than 8% of the pore volume of the core was attained by injecting 1 pore volume of the surfactant system.

In Test B the core was preflooded with half strength SDS water (with the diluent being distilled water) then flooded with a surfactant system consisting of 4.9% Triton X-200 surfactant (active basis) in ½ strength SDS water; which system had a viscosity of 1.05 centipoise. As shown by curve b, this provided very little displacement.

The Triton X-200 surfactant has a combination of structure and size of alkyl groups and number of ethoxy groups adapting it to be at near optimum oil-displacing activity in 100% SDS water. An otherwise similar surfactant, Triton X-202, which contains an average of one ethoxy group per molecule was indicated (by the microscopic screening test of such surfactant in distilled water solutions of sodium chloride) to have an optimum oil-displacing activity at a salt concentration of only 1.0 to 1.5 molar (rather than the 2 to 3 molar optimum region of Triton X-200. Such a difference in salinity requirement is indicative of how the number of ethoxy grups can be varied to provide an alkylaryloxypolyethoxyethane sulfonate surfactant for use in an aqueous liquid having a given salt content.

Figure 3B:
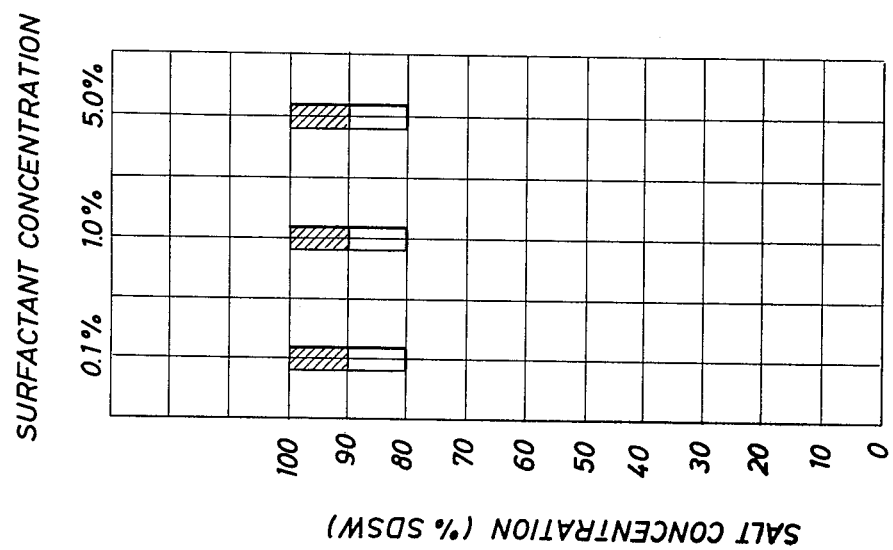
FIG. 3b shows a similar plot relative to surfactant systems containing alkylaryloxypolyethoxyethane sulfonate surfactants.
Figure 3A:
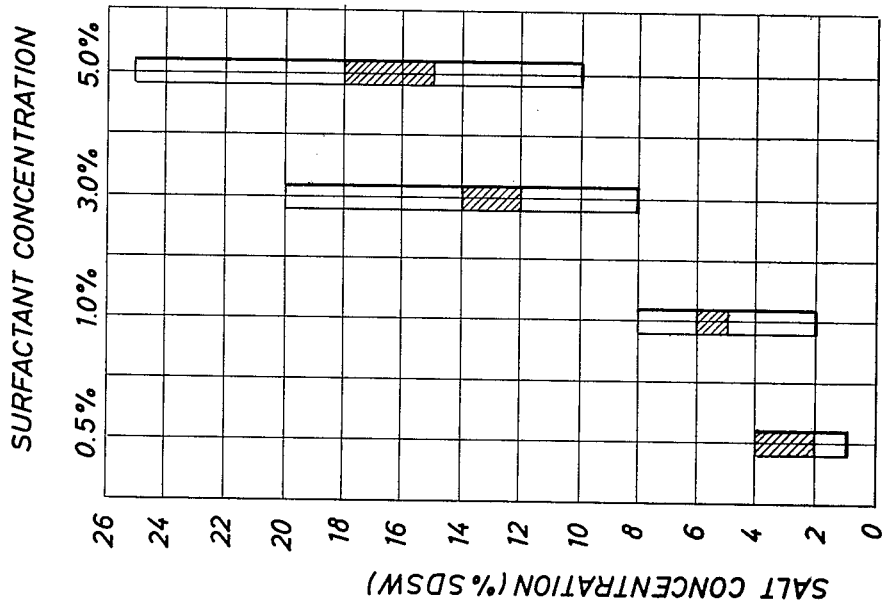
FIG. 3a shows a plot of the range of salt concentrations at which aqueous surfactant systems containing different concentrations of Petronate 10–80 petroleum sulfonate surfactants are at or near their optimum oil displacing activity.

FIGS. 3A and 3B show the relationship between surfactant concentration and optimum electrolyte concentration for an alkylaryloxypolyethoxyethane sulfonate surfactant system of the present invention, as compared to that of a petroleum sulfonate surfactant system of the prior art. Dispersions of the indicated percentages by weight of the surfactants in aqueous solutions of varying salt concentration (prepared by distilled water dilutions of the SDS water) were screened for their oil-displacing activity against a reservoir crude (by the microscope method). The rectangular bars appearing under the various surfactant concentrations indicate the regions of effective oil-displacing activity and the solid (or shaded) portions of those bars indicate the regions of highest or optimum activity. The tested petroleum surfactant (which was a Petronate 10-80 sulfonate surfactant, comprising a sulfonated petroleum fraction having an equivalent weight of 420) exhibited the high response to concentration of surfactant that is typical of petroleum sulfonate surfactants. For example, the Petronate surfactant activity was optimum with salt concentrations equivalent to from about 15 to 18% SDS water, when the surfactant concentration was 5%, but, when the surfactant concentration was reduced to 1%, the optimum activity was limited to SDS water concentrations of only from about 5 to 6%.

FIG. 3B shows the results of such tests of systems containing Triton X-200 surfactant systems in the concentrations specified by the present invention. The difference is dramatic. From surfactant concentrations as low as 0.1% by weight to as high as 5.0% by weight, the range of salt concentrations that provided optimum oil displacing activity were the same for each concentration of the surfactant—and were equivalent to the high salinity of from 90 to 100% of the SDS water.

Additional comparative oil displacement experiments were conducted in three Berea sandstone cores having diameters of 2" and lengths of 10". In each test the core was preflooded with SDS water, flooded with a typical crude oil then water flooded with SDS water to a residual oil saturation of about 39% plus or minus 1% of the pore volume of the core. In each test the surfactant system was used in the form of a slug (amounting to 25% of the core pore volume) which contained the Triton X-200 surfactant in SDS water in the concentrations indicated below, and was injected immediately ahead of a drive fluid of the type indicated below (with the core maintained at a temperature of 75° C.).

In the first test the surfactant system contained 7% by weight of the surfactant and was displaced through the core with SDS water. This resulted in a residual oil saturation of 27% of the core pore volume.

In the second test the surfactant concentration was 7% and the surfactant system was displaced through the core with SDS water containing 1,000 parts per million of xanflood biopolymer and having a viscosity of 10.4 centipoises. This provided a residual oil saturation of 21.1% of the core pore volume.

In the third experiment a concentration of the surfactant was only 5% and the surfactant system was displaced through the core by alternate injections of slugs having volumes of 10% of the core pore volume, of an aqueous solution of 0.2% of the same surfactant in SDS water and nitrogen gas. This reduced the residual oil saturation to only 13% of the core pore volume.

In the first, in which no mobility control was provided, only a negligible amount of additional oil was recovered. In the third test, despite the lower chemical concentration of only 5% rather than 7%, the use of the drive fluid comprising the alternating slugs of liquid and nitrogen gas provided a significantly greater oil recovery than that obtained in the second test, in which the drive fluid was a conventional type polymer thickened aqueous liquid. The third test simulated a situation in which a highly saline reservoir was waterflooded with the reservoir brine, and then chemically flooded in accordance with the present process with the reservoir brine being used as the aqueous phase of the surfactant system. Since, as indicated by the present test, such a proedure is relatively insensitive to dilutions of the surfactant system, it substantially completely eliminated problems due to surfactant polymer interaction, cation exchanges within the reservoir, or polymer-surfactant incompatibilities.

SUITABLE CHEMICALS AND TECHNIQUES

The oil-bearing reservoirs to which the present invention is applied are preferably those containing a significant saturation such as from about 20–50% of an oil having a viscosity of from about 1 to 10 centipoise at the reservoir temperature. Such reservoirs can be substantially any having permeabilities suitable for oil production by means of a waterflood process.

In general, the alkylaryloxypolyethoxyethane sulfonate surfactants suitable for use in the present process are those which contain a total of from about 6 to 12 (preferably 8 to 9) carbon atoms in saturated or unsaturated alkyl groups attached to a phenyl group which is attached by an ether-oxygen atom to a chain of from about 1 to 6 (preferably 2 to 4) ethoxy groups which chain is terminated by an ethanesulfonate group. Numerous individual members of such compounds and procedures by which they can be manufactured are mentioned in "Surface Active Agents" by A.M. Schwartz and J.W. Perry, Vol. 1 and 2, Interscience Publishers, N.Y., 1949, and U.S. Pat. Nos. 3,827,497; 3,977,471; 4,066,124; 4,018,278 and 4,088,189. Particularly suitable compounds comprise octylphenoxypolyethoxyethane sulfonates having oil-displacing and foam-forming properties at least substantially equivalent to those of the Triton X-200 sulfonate surfactant.

In the present process, in effect, both the chemical composition and concentration of both the surfactant and the aqueous liquid of the injected aqueous surfactant system are correlated with the physical and chemical properties of the rocks and oil and water of the reservoir. The chemical composition of the reservoir tailored surfactant and the aqueous liquid in which it is dispersed are such that the resulting surfactant system exhibits the above-described properties of oil-displacing activity, phase behavior, mobility, and avoidance of deleterious changes in salinity due to ion exchange within the reservoir, with the surfactant concentration being as low as about 0.1% by weight. In addition, at the time the surfactant system is injected, the surfactant concentration should be less than about 10% but more than about 0.1% by enough so that, within a significant portion of the surfactant system being displaced through the reservoir, the concentration will remain about 0.1% and the oil-displacing activity will remain high. In general, this is ensured by injecting the surfactant system at a sulfonate concentration of from about 3 to 10% by weight, where the volume of the injected system is from about 10 to 20% of the pore volume of the portion of the reservoir through which the injected fluid will be displaced.

Where the mobility of the aqueous surfactant system prepared in accordance with the present process is undesirably high relative to that of the reservoir oil, the effective mobility of that system can readily be reduced by dispersing a noncondensible gas within at least a portion of the surfactant system. This utilizes applicant's discovery of the relatively low mobility foam-forming capabilities of the presently specified surfactant systems, and can be done in numerous ways. For example, (a) the injection of a relatively small proportion such as about 0.1 pore volume of the swept zone of the reservoir of the surfactant system can be followed by an injection of a portion of noncondensible gas having a substantially equal volume at the pressure and temperature of the reservoir with such alternations being repeated until a suitable total volume of surfactant system, such as from about 10–20% of the pore volume of the swept zone of the reservoir has been injected, (b) the noncondensible gas can be injected simultaneously with some or all of the selected amount of surfactant system, (c) the proportion of noncondensible gas which is dispersed in liquid to form the drive fluid injected immediately behind the surfactant system can be made high enough to cause a relatively prompt migration of gas into the surfactant system, or the like.

Aqueous liquids suitable for use in the present process can comprise substantially any aqueous liquid having a salinity which is the same as or is equivalent to that of the water present in a subterranean oil reservoir in which the predominant liquid phase is an aqueous solution containing at least about 9% by weight total dissolved salt. As used herein "salinity" refers to the total organic and inorganic electrolyte content of the aqueous liquid, including the small proportions of the surfactant sulfonic acid salts which are dissolved and ionized within the aqueous liquid phase of the surfactant system. Suitable aqueous liquids include the brines contained in high salinity oil reservoirs, and/or surfactant systems formed from such brine. Such aqueous liquids, preferably contain a ratio (in parts by weight) of about 10 parts monovalent cation to one part polyvalent cation. A preferred aqueous liquid is typified by the SDS water described above.

The aqueous surfactant systems and the dispersions of noncondensible gas in aqueous saline liquid which are used in accordance with the present process can advantageously contain additives such as corrosion inhibitors, stabilizers, bactericides, and the like, such as those conventionally used in chemical flood oil recovery processes, as long as such additives are compatible with the surfactant systems and gas dispersions of the present invention.

The noncondensible gas utilized in the present process can be substantially any which remain relatively inert and is neither significantly condensed or dissolved at the temperature, pressure and fluid content conditions created during the application of the process to an oil-containing reservoir. Examples of such gases include nitrogen, air, flue gas, combustion gas, and the like. Particularly suitable procedures for forming and/or injecting mobility-controlling liquids containing such gases are described in U.S. Pat. No. 3,653,440 and such procedures are incorporated herein by cross-reference.

What is claimed is:

1. A process for recovering oil from an oil reservoir in which the salinity of the predominant water phase is at least about 9% by weight and the oil is displaced by injecting into the reservoir, ahead of a relatively low mobility aqueous drive fluid, an aqueous surfactant system in which the surfactant consists essentially of at least one alkylaryloxypolyethoxyethane sulfonate surfactant dispersed within an aqueous liquid which is the same as the aqueous liquid contained in the reservoir or is substantially equivalent to that liquid in salinity, which process comprises:

employing as said surfactant a reservoir-tailored compound or mixture of one or more alkylaryloxypolyethoxyethane sulfonates providing an arrangement of the size and structure of alkyl groups and proportion of ethoxy groups such that, when the reservoir-tailored surfactant is dispersed in said aqueous liquid at the reservoir temperature, the dispersion (a) exhibits an effective optimum or near-optimum oil-displacing activity at a surfactant concentration as low as about 0.1% by weight, (b) is a substantially single-phase system at the reservoir temperature, and (c) is sufficiently viscous by itself or when mixed with noncondensible gas to be capable of exhibiting a mobility at least substantially as low as that of the reservoir oil within the reservoir;

employing as said aqueous liquid one which (a) contains a ratio of about 10 parts by weight of monovalent cation per part by weight of polyvalent cation and (b) is the liquid produced from the reservoir or one that is so similar in salinity as to be capable of maintaining a salinity which is substantially unaltered by ion-exchange reactions which occur when that liquid is flowed within the reservoir;

injecting into the reservoir an aqueous surfactant system consisting essentially of a dispersion of from about 3 to 10% by weight of the reservoir-tailored surfactant within said employed aqueous liquid, with the concentration of the surfactant being sufficient to cause a significant proportion of the injected surfactant system to retain a concentration of at least about 0.1% of the surfactant in spite of the dilution that occurs during the displacement of the surfactant system within the reservoir; and, injecting into the reservoir immediately behind at least a portion of the injected aqueous surfactant system an aqueous drive fluid consisting essentially of a substantially homogeneous dispersion of noncondensible gas in an aqueous liquid that is the same as the aqueous liquid in which the reservoir-tailored surfactant is dispersed to form the injected surfactant system or is substantially equivalent to that liquid in salinity, with the injected dispersion being capable, at the reservoir temperature, of exhibiting a mobility within the reservoir at least substantially as low as that of the injected surfactant system.

2. The process of claim 1 in which the aqueous liquid phase of the drive fluid, at the time it is injected, contains at least about 0.2% by weight of a reservoir-tailored surfactant which is the same as that used in the injected surfactant system.

3. The process of claim 1 in which portions of the aqueous surfactant system are injected as a series of slugs alternating with equal volume slugs of noncondensible gas.

4. The process of claim 1 in which the proportion of gas mixed with the liquid phase of the drive fluid is high enough to cause gas to move ahead of the drive fluid and become dispersed within the injected surfactant system.

5. The process of claim 1 in which the aqueous liquid in which the reservoir-tailored surfactant is dispersed to form the injected surfactant system is aqueous liquid produced from the reservoir.

6. The process of claim 1 in which the reservoir-tailored surfactant used to form the injected surfactant system is an octylphenoxypolyethoxyethane sulfonate having foam-forming and oil-displacing property, at least substantially equivalent to those typified by the Triton X-200 sulfonate surfactant.

* * * * *